US006178180B1

(12) United States Patent
Eng et al.

(10) Patent No.: US 6,178,180 B1
(45) Date of Patent: Jan. 23, 2001

(54) COMMUNICATIONS ADAPTER FOR PROCESSING ATM AND ISDN DATA

(75) Inventors: Robert Chih-Tsin Eng, Boca Raton; Kevin Lee Graves; Himanshu Chandrakant Parikh, both of Coconut Creek; John Claude Sinibaldi, Pompano Beach, all of FL (US)

(73) Assignee: International Business Machines Corp., Armonk, NY (US)

( * ) Notice: Under 35 U.S.C. 154(b), the term of this patent shall be extended for 0 days.

(21) Appl. No.: 08/979,531

(22) Filed: Nov. 26, 1997

(51) Int. Cl.[7] ................................................. H04L 12/66
(52) U.S. Cl. ............................................ 370/466; 370/401
(58) Field of Search ................................. 370/403, 466, 370/467, 395, 401, 524, 352, 353, 354, 355, 356, 465; 710/260; 709/249, 250

(56) References Cited

U.S. PATENT DOCUMENTS

| 5,375,118 | * | 12/1994 | Rao et al. | |
| 5,572,695 | | 11/1996 | Andrews et al. | 395/412 |
| 5,602,841 | | 2/1997 | Lebizay et al. | 370/413 |
| 5,809,022 | * | 9/1998 | Byers et al. | 370/395 |
| 5,867,496 | * | 2/1999 | Peres et al. | 370/376 |
| 5,930,250 | * | 7/1999 | Klok et al. | 370/352 |
| 5,959,996 | * | 9/1999 | Byers | 370/401 |
| 5,968,158 | * | 10/1999 | Andrews et al. | 710/260 |

OTHER PUBLICATIONS

*IBM Technical Disclosure Bulletin*, Buffer Management for Primary Rate Communications Adapters, vol. 34, No. 8, Jan. 1992, pp. 313–316.

*IBM Technical Disclosure Bulletin*, Foreground State Machine Facility for Multi–Channel Data Link Communications, vol. 35, No. 4A, pp. 266–271.

* cited by examiner

*Primary Examiner*—Ricky Ngo
(74) *Attorney, Agent, or Firm*—Richard A. Tomlin; Ronald V. Davidge

(57) ABSTRACT

A communications adapter card provides an interface for a TI or E1 transmission line and a signal processing circuit which can be programmed to process receive and transmit data in either an ISDN or an ATM format. Preferably, two such interfaces and two such signal processing circuits are provided on the card, so that a single adapter card can be used for attachment to both an ISDN network and to an ATM network. Each signal processing circuit includes a pair of DSPs, each of which has a two port buffer extending to a parallel bus. All such DSPs are connected to a data bus. The DSPs in each signal processing circuit execute programs to operate in either an ATM mode or an ISDN mode.

6 Claims, 4 Drawing Sheets

COMMUNICATIONS ADAPTER FOR PROCESSING ATM AND ISDN DATA

CROSS-REFERENCE TO RELATED APPLICATIONS

This application is related to a co-pending U.S. application, Ser. No. 08/944209, filed Oct. 6, 1997, entitled "A DSP-Based, Multi-Bus, Multiplexing Communications Adapter," having a common assignee with the present invention, the disclosure of which is incorporated herein by reference. This co-pending application describes a pair of communications adapters, which each include a number of digital signal processors and network interface circuits for the attachment of a multi-channel telephone line. A bus connecting the communications adapters can carry data between a network line attached to one of the adapters and the digital signal processors of the other adapter. The digital signal processors on each card are connected to a host, or controller, processor. Each DSP (digital signal processor) interrupts its host processor by transmitting an interrupt control block as data to a data memory of the host processor, and by subsequently sending an interrupt causing the host processor to examine the data memory. Preferably, the interrupt control block includes data representing a number of requested interrupts.

This application is also related to a co-pending U.S. application, Ser. No. 08/951842, filed Oct. 16, 1997, entitled "Intelligent Router for Internet Access," having a common assignee with the present invention, the disclosure of which is incorporated herein by reference. This co-pending application describes a remote network server including primary and secondary routers, each of which include means for emulating a number of different modem types and for operating in accordance with a number of different communication protocols. Incoming calls are directed at the primary router, but are routed through the secondary router if either the type of modem making a call cannot be emulated in the primary router or if the primary router cannot operate with the protocol used by this calling modem.

This application is also related to a co-pending U.S. application, Ser. No. 08/973,530 filed Nov. 26, 1997, entitled "Multi-Speed Kernel and Clock Mechanism," having a common assignee with the present invention, the disclosure of which is incorporated herein by reference. This co-pending application describes a DSP which runs at one of a number of processing speeds in accordance with its measured ability to perform various functions reliably and the functions required by a particular task being executed. A number of DSPs of this type are used in an ISDN adapter, with each DSP having a processor kernel operating at multiple speeds determined in this way, while a clock driving peripheral functions is derived from a network interface circuit signal synchronized with received data.

BACKGROUND OF THE INVENTION

1. Field of the Invention

This invention relates to a communications adapter, and more particularly to such an adapter which can be used both for time-division multiplexed signals in an ISDN environment and for digital packets in an ATM environment.

2. Background Information

In North America, the PRI (Primary Rate Interface) version of ISDN (Integrated Services Digital Network) service provides 23 B (Bearer) channels at 64 kbps and a single D channel, also at 64 kbps. In Europe, this version provides 30 B channels and a single D channel. User information is carried on the B channels, with the D channel being used for call control. In North America, this service is provided along a T1 transmission line, while in Europe, this service is provided along an E1 transmission line. The various channels are combined for transmission along a single wire by means of TDM (Time Division Multiplexing), with the channels being given fixed-length frames, or segments of transmission time, in a sequential fashion. Using ISDN, a computing system can place and receive calls over the public switched telephone network to a different client device on each channel, or to another device configured to transmit and receive ISDN data.

Asynchronous Transfer Mode (ATM) service uses a packet-mode technology in which information is transmitted in cells having a fixed length of 53 bytes. Each cell includes a header having a length of 5 bytes, including information needed to send the cell data to the correct location, and a payload of 48 bytes, including the data being transmitted. This ATM technology is used extensively with fiber optical transmission lines to form LANs (Local Area Networks) and backbones tying conventional LANs together. ATM service may also be provided along a T1 data transmission line in North America and along an E1 data transmission line in Europe.

Since many organizations have a need to communicate both with a LAN using ATM technology and with one or more remote locations using ISDN service over the public switched telephone network, what is needed is a communications adapter which can be configured to operate with either or both ATM and ISDN data.

Description of the Prior Art

U.S. Pat. No. 5,572,695 describes a digital signal processing system including first and second logical memory mapping units coupled to first and second digital processors, respectively, and to a data storage unit. The system further includes first and second mapping registers for containing first and second address mapping information coupled to the first and second digital processors, respectively. The first and second mapping units are operative to receive (i) first and second logical addresses generated by the first and second digital processors respectively and (ii) first and second address mapping information respectively, and generate first and second physical addresses such that each of the digital processors can independently access any of a plurality of memory locations within the data storage unit.

In a first mode of operation, each DSP shares only the first memory page (e.g. 64K words) of DRAM (data RAM) memory, with the first and second logical lookup addresses being independently mapped to the first lookup region. In a second mode of operation, each DSP can share the first and second memory pages (e.g. 128K words of in the DRAM, with the first and second logical lookup addresses being independently mapped to either one of the first and second lookup regions. In a third mode of operation, each DSP has its own dedicated memory page (e.g. 32K words), with the first logical lookup addresses being mapped into the first lookup area of the DRAM. In the first and second of these modes of operation, the first and second DSPs can both share the same channel area when necessary, allowing one DSP to perform transmit functions while the other DSP performs receive functions on the same channel.

U.S. Pat. No. 5,602,841 describes an efficient point-to-point and multipoints routing system and method for programmable data communication adapters in packet switching modes of high-speed networks. The general principles of efficiency are, first, that data packets are never copied during their routing through the adapter, with only packet pointers being copied for each destination, second, that no overhead is generated by the multi-points routing in the real-time procedures, third, third, that each output is processed independently by means of interrupts, and, fourth, that the release of the resources is entirely realized on a non-priority mode. The system is described as having an adapter including a receive adapter with a receive specific purpose processor and a transmit adapter having a transmit specific purpose processor.

Again, what is needed is a communications adapter which can operate with both ATM and ISDN data.

SUMMARY OF THE INVENTION

It is therefor an objective of the present invention to provide a communications adapter which can be used for either ISDN or ATM data.

It is another objective of the present invention to provide a communications adapter attaching to two transmission lines to process ISDN data transmitted and received along a first such transmission line simultaneously with ATM data transmitted and received along the second such transmission line.

Thus, according to a first aspect of the present invention, there is provided a communications adapter including a first connector for electrically connecting a first transmission line, a first network interface extending into the communications adapter from the first connector, a data bus, and first signal processing means electrically connecting the data bus with the first network interface. The first signal processing means is operable in an ISDN mode, converting data from the data bus for transmission in an ISDN format from the communications adapter through the first connector and converting data received by the communications adapter through the first connector in the ISDN format into an encoded format for transmission from the first processing means along the data bus. The first signal processing means is additionally operable in an ATM mode, converting encoded data from the data bus for transmission in an ATM format from the communications adapter through the first connector and converting data received by the communications adapter through the first connector in the ATM format into an encoded format for transmission from the first processing means along the data bus.

According to a second aspect of the present invention, the communications adapter described above additionally includes a second connector for electrically connecting a second transmission line, a second network interface extending into the communications adapter from the second connector, a data bus, and second signal processing means electrically connecting the data bus with the second network interface. The second signal processing means has capabilities similar to those of the first signal processing means. The first and second signal processing means are preferably independently programmably configurable for operation in the ISDN mode or in the ATM mode. Each of the signal processing means preferably includes a pair of digital processors, a parallel bus, and a serial to parallel interface.

DETAILED DESCRIPTION

Figure 1:
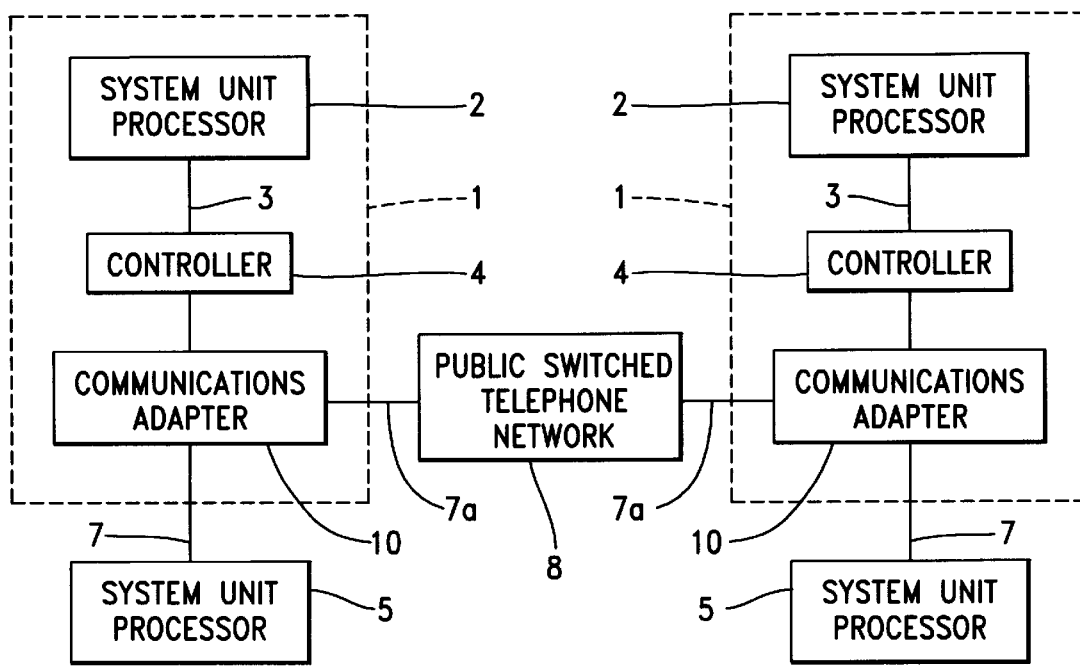
FIG. 1 is a schematic view of a pair of computing systems, each using a communications adapter built in accordance with the present invention to communicate with one another using ISDN service and to communicate with a LAN using ATM service.

FIG. 1 is a schematic view of a pair of computing systems, each using a communications adapter built in accordance with the present invention to communicate with one another using ISDN service and to communicate with a LAN using ATM service. In this example, each computer system 1 includes a system unit processor 2 having a PCI (Peripheral Component Interconnect) bus 3 extending to a controller 4. Data is transferred between a LAN, in the form of a local ATM network 5, and each computer system 1 over a transmission line 7. Also connected to the computer system 1 is an ISDN transmission line 7a, which extends into the public switched telephone network 8. The transmission lines 7, 7a are each, for example, a T1 line in the United States or an E1 line in Europe. Each computing system 1 may be, for example, an IBM 7588 industrial computer, having a PCI bus 3 which can be connected to the controller 4. In accordance with an application of the present invention, the transmission lines 7, 7a are both connected to a single communications adapter card 10.

Figure 2:
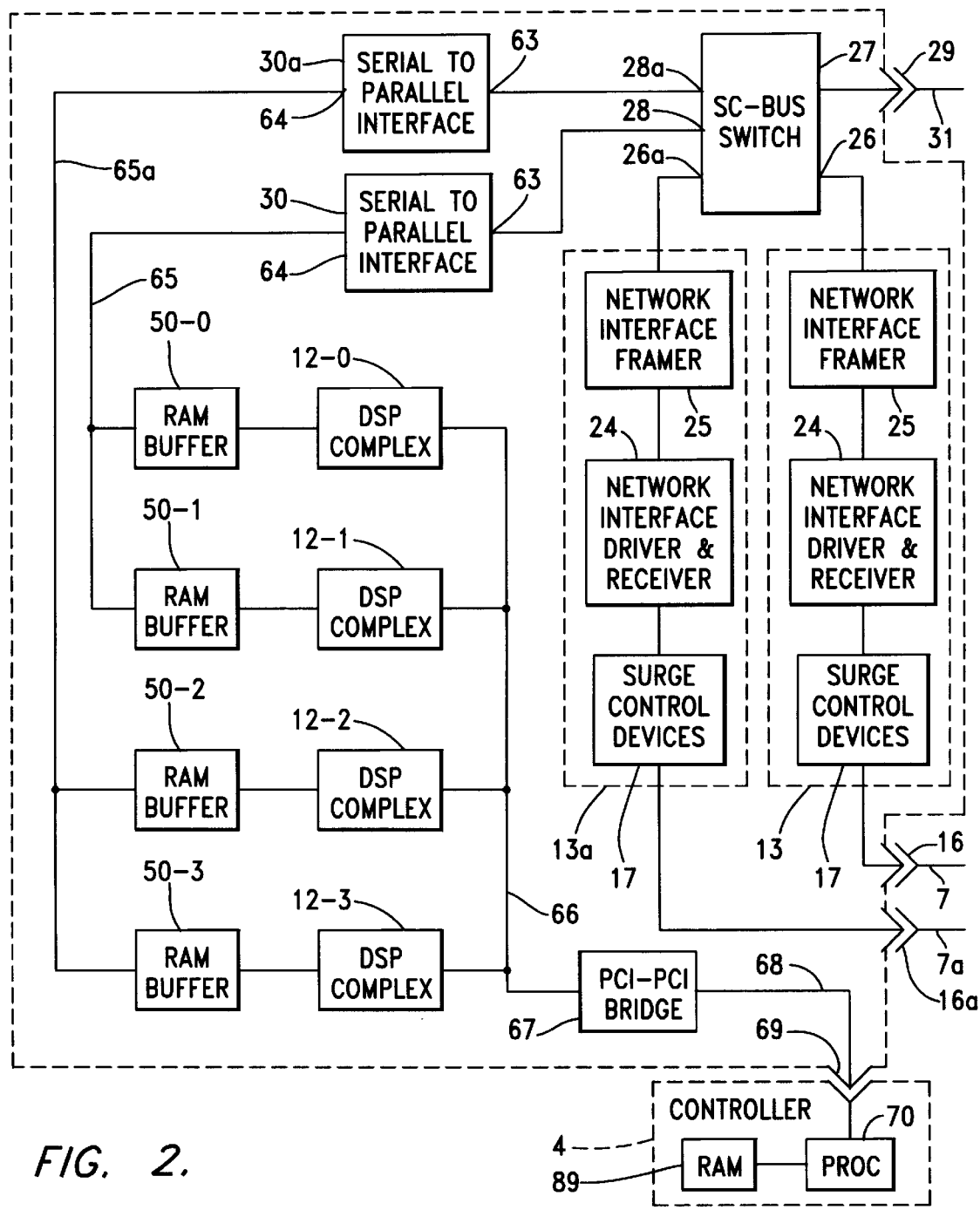
FIG. 2 is a functional block diagram of the communications adapter of FIG. 1, showing particularly the routes of data flow.

FIG. 2 is a functional block diagram of the communications adapter card 10 of FIG. 1, particularly showing the routes of data flow. Four DSP subsystems 12 are provided for signal processing on this card 10. In the example of FIG. 2, either or both of the transmission lines 7 and 7a may carry data in either the ISDN or ATM format.

The first E1 or T1 transmission line 7 is connected to a first network interface circuit 13 within the adapter card 10 through a first network interface connector 16, and the second E1 or T1 transmission line 7a is connected to a second network interface circuit 13a within the adapter card 10 through a second network interface connector 16a. Within each network interface circuit 13, 13a, lines from the connector 16 or 16a are routed through surge control devices 17, network interface driver and receiver 24, and network framer 25. The network interface driver and receiver 24 is, for example, a Siemens PRACT (Primary Rate Access Clock and Transceiver) PEB 22320 chip. The network framer chip 25, is, for example, be a Siemens ACFA (Advanced CMOS Frame Aligner) PEB 2035 chip. The network interface driver and receiver 24 generates the primary clock interface for all of the TDM hardware modules, such as network framer chip 25, the serial to parallel interface circuits 30, 30a, and the SC-bus switch 27. The network interface driver and receiver 24 and the network framer chip 25 are controlled by DSP subsystem 12-0, in a manner which will be described in reference to FIG. 3. Each network interface circuit 13, 13a also includes conventional elements, such as transformers for receive and transmit circuits, termination resistors, and diode clamps (not shown). While changes in programming can cause the communications adapter 10 to operate in alternate modes as required by attachment to an E1 or T1 line, changes in a hardware configuration of network impedance matching resistors are also required between these modes. Serial transmit and receive lines from the first network interface circuit 13 are connected to a first local port 26 of an SC-bus switch 27, while serial transmit and receive lines from the second network interface circuit 13a are connected to a second local port 26a of the SC-bus switch 27. The SC-bus switch 27 also includes a third local port 28 and a fourth local port 28a, which are connected to serial to parallel interface circuits 30 and 30a, respectively, which connect serial transmission lines extending from the SC-bus switch 27 with circuits on the communications adapter 10 using and supplying data in a parallel format. Each serial to parallel interface circuit 30, 30a is, for example, a Mitel MT8920B interface chip. The SC-bus switch 27, is, for example, a VLSI SC4000 interface chip, or, depending on the channel capacity needed, two or more of such chips.

The communications adapter card 10 supports an SCSA (Signal Computing Systems Architecture) interface at its top edge along a 26-pin connector 29. This interface supplies all of the necessary clocking signals, and sixteen serial data signals for card-to-card communications. This interface has the capability of eight full-duplex T1 or E1 network lines. Additionally, for ISDN data, the number of timeslots per frame is programmable to be 32 or 64. Preferably, this parameter is programmed to 32 timeslots per frame.

The switching function is implemented through two RAM memories associated with the SC-bus switch 27, with a destination routing memory controlling data movement from the local ports 26, 26a, 28, 28a to the SC-bus 31, while a source routing memory controls data movement from the SC-bus to the local ports. The timeslot number serves as the address to either routing memory, while the data stored in the routing memory becomes the switched timeslot number. For ISDN data, actual timeslot serial data is loaded in frame buffers and routed through multiplexing circuits controlled by the destination and source routing memories. There is a oneframe delay for data traveling through the SC-bus switch 27 in either direction.

In accordance with a preferred version of the present invention, the switch 27 is operated to connect serial to parallel interface 30 with either network interface circuit 13 or with the SC-bus 31, and to connect serial to parallel interface 30a with either network interface circuit 13a or with the SC-bus 31. The network interface circuit 13 is connected either to the serial to parallel interface 30 or to the SC-bus 31, and the network interface circuit 13a is connected either to the serial to parallel interface circuit 30a or the SC-bus 31.

The SC-bus extending from connector 29 is used, for example, to transfer signals to additional DSP complexes on other cards for additional processing, or to bring data from other sources onto the communications adapter for transmission along one of the transmission lines 7, 7a.

Figure 3:
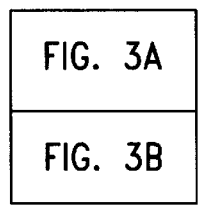
FIG. 3 is functional block diagram of two DSP subsystems in the communications adapter of FIG. 1, together with associated circuits, with FIG. 3A therein including a first of these DSP subsystems and data transmission circuits, while FIG. 3B therein includes a second of these DSP subsystems.

The SC-bus switch 27 is the main clock source for all TDM clock functions, receiving a reference clock from one of the network interface driver and receiver modules 24, in a manner to be discussed with reference to FIG. 3. This clock signal is synchronized to an incoming data stream received from a network transmission line 7 or 7a. From this reference clock, the SC-bus switch 27 generates all main SC-bus clocks and all of the local port clocks. The local ports have a 4.096-Mhz bit clock and an 8-Khz frame synch clock, which are supplied to the network interface framer 25 and to the serial to parallel interface 21. When several communications adapter cards 10 are connected by the SC-bus 42, as shown in the example of FIG. 3, the SC-bus switch 27 of one of the cards 10 is programmed to be the master clock source, while the switches 27 on the other cards 10 are programmed to operate as slaves. In this way, the TDM data paths on all the cards 10 are synchronized to a single network cable 7. If this single clock source should fail, the SC-bus switches 27 have an ability to switch to another such switch 27 as an alternative master clock source, supporting a soft recovery mode of operation.

The serial to parallel interface chip 30 provides the connection between local port 28 of the SC-bus switch 27 and one port of each of two RAM buffers 50-0 and 50-1. A similar serial to parallel interface chip 30a provides the connection between local port 28a of the SC-bus switch 27 and one port of each of two RAM buffers 50-2 and 50-3. Each of these RAM buffers 50 is a two-port 16-KB device. Serial transmit and receive data between the serial to parallel interface circuits 30, 30a and the SC-bus 27 is clocked, for example, at an E1 ISDN line speed of 2.048 Mbits per frame and 8000 frames per second. Data is shifted into one buffer 50 and out of another buffer 50 in full duplex mode. Separate transmit and receive 2-port RAM buffers (not shown) within each serial to parallel interface chip 30, 30a each have one port tied to a separate serial port 63, while the other port of both these buffers is tied to a common parallel port 64. One byte of transmit data is read from the transmit buffer RAM one channel time before it is shifted out the serial port 63 of this chip 27, and one byte of receive data is written to the receive buffer RAM one channel time after it is shifted in from the serial port 63.

A parallel bus 65 extending between the serial to parallel interface chip 30 and the RAM buffers 50-0, 50-1 provides an 8-bit data bus and a 5-bit address bus, a WRITE ENABLE pulse, and a READ ENABLE pulse. This interface allows direct connection of the RAM buffers 50-0, 50-1, being timed to read one byte and write one byte of parallel data as the serial interface from the serial to parallel interface chip 30 is shifting four bits in or out. Similarly, a parallel bus 65a extending between the serial to parallel interface chip 30a and the RAM buffers 50-2, 50-3 provides an 8-bit data bus and a 5-bit address bus, a WRITE ENABLE pulse, and a READ ENABLE pulse. This interface allows direct connection of the RAM buffers 50-2, 50-3, being timed to read one byte and write one byte of parallel data as the serial interface from the serial to parallel interface chip 30a is shifting four bits in or out.

With ISDN data, each parallel interface port 64 writes all 24 for T1, or 32 for E1, channels of receive data for every frame into both two-port RAM buffers 50 attached thereto simultaneously, with data from each frame being placed into a unique region within the buffer 50. In this way, both DSP subsystems 12 connected through buffers to the port 64 have access to all receive data from the port, with upper layers of a program executing within the DSP subsystems processing data from individual timeslots. On the other hand, parallel transmit data is read from the transmit portion of a single two-port RAM buffer 50 at a time into the parallel interface port 63. The transmit portion of each two-port RAM buffer 50 preferably stores data for 12 channels of data for T1, or 16 channels of data for E1, transmission.

With ATM data, each parallel interface port 64 writes all receive data into the two-port RAM buffer 50-1 or 50-3 attached thereto, with the data being stored in predetermined regions within the RAM buffer. A program executing within the associated DSP subsystem 12-1 or 12-3 looks for the ATM header within the receive data which has been written into the RAM buffer. This program also checks the CRC (Cyclic Redundancy Check) data sent with each ATM header. When the header is found, this program synchronizes its operation with the location of this header, since each ATM cell is known to be 53 bytes long, including a 5-byte header. Within the DSP subsystem 12-1 or 12-3, the headers are stripped away, so that the remaining "payloads" of data can be processed. For both receiving and transmitting ATM data, the DSP subsystems 12 perform various lower level protocol tasks. Parallel transmit data is read from either the two-port RAM buffer 50-0 or 50-2 to the parallel interface port 64 attached thereto. This data includes a 5-byte header and a 48-byte payload for each ATM cell to be transmitted. The DSP subsystem 12-0 or 12-2 generates the CRC data for each header to be transmitted. Thus, one of the DSP subsystems connected to a port 64 has access to all receive data from the port, while parallel transmit data is read from the buffer attached to the other DSP subsystem.

Each 2-port static RAM buffer 50, being divided into transmit and receive buffers (not shown), stores eight consecutive frames of ISDN data to be transmitted or received. All 32 channels for each frame are allocated for both transmit and receive buffers. Each DSP subsystem 12 can access 256 bytes of receive buffer data and 256 bytes of transmit buffer data. The serial to parallel interface circuits 30, 30a requires a dedicated port to each of these buffers continuously. A 3-bit frame counter function is implemented in circuits associated with the DSP subsystem 12-0, which will be discussed in reference to FIG. 5. These three bits, together with the five address bits driven along busses 65, 65a from the serial to parallel interface circuits 30, 30a, provide for the selection which must be made among the transmit and receive buffers within the RAM buffers 50. The serial to parallel interface 30 can only read from the transmit buffers within the RAM buffers 50-0 and 50-1 and can only write to the receive buffers therein. Both receive buffers in RAM buffers 50-0 and 50-1 are written simultaneously, but only one transmit buffer therein is read at a time. Similarly, the serial to parallel interface 30a can only read from the transmit buffers within the RAM buffers 50-2 and 50-3 and can only write to the receive buffers therein. Both receive buffers in RAM buffers 50-2 and 50-3 are written simultaneously, but only one transmit buffer therein is read at a time.

The other, opposite port of each two-port RAM buffer 50 is dedicated to an associated DSP subsystem 12, which can only write to the transmit buffer within the RAM buffer 50 and read from the receive buffer therein.

In accordance with a preferred version of the present invention, either of the transmission lines 7, 7a may transmit and receive either ISDN data or ATM data. When data is to be transmitted between the buffers 50 and these transmission lines 7, 7a, the buffers 50-0 and 50-1 are connected to the transmission line 7, and the buffers 50-2 and 50-3 are connected to the transmission line 7a. When ISDN data is to be transmitted and received on transmission line 7, data transmitted and received along a first plurality of the ISDN channels moves through the RAM buffer 50-0 while data transmitted and received along a second plurality of the ISDN channels moves through the RAM buffer 50-1. Similarly, when ISDN data is to be transmitted and received on transmission line 7a, data transmitted and received along a first plurality of the ISDN channels moves through the RAM buffer 50-2 while data transmitted and received along a second plurality of the ISDN channels moves through the RAM buffer 50-3. When ATM data is to be transmitted and received on transmission line 7, the received data flows through RAM buffer 50-0, while the transmitted data flows through RAM buffer 50-1. When ATM data is to be transmitted and received on transmission line 7a, the received data flows through RAM buffer 50-2, while the transmitted data flows through RAM buffer 50-3.

Four DSP subsystems 12 are each connected to a PCI bus 66 extending along the card 10, and to a two-port data RAM 50 which is provided as a transmit/receive buffer for each of the corresponding DSP subsystems 12. Each 2-port data RAM 50 is a 1K×8 high-speed static RAM device, such as a Cypress CY7C131 memory module. The PCI bus 66 is connected through a PCI-PCI bridge circuit 67 to a bus 68 extending through the PCM PCI connector 69 into the controller card 4. The PCI bus 66 is a synchronous 32-bit I/O interface running at 33 Mhz. Interrupts A through D, as defined by the PCI local bus architecture, are used, with the DSP subsystem 12-0 being connected to interrupt line A, the DSP subsystem 12-1 being connected to interrupt line B, the DSP subsystem 12-2 being connected to interrupt line C, and the DSP subsystem 12-3 being connected to interrupt line D. All interrupt functions between these DSP subsystems 12 and the controller card 4 are controlled by a processor 70 of the controller card 4, which is, for example, an Intel 80960 processor.

Two DSP subsystems 12-0 and 12-1 may operate in an ISDN mode, executing programs controlling the processing of ISDN receive and transmit data, or alternately in an ATM mode, executing programs controlling the processing of ATM receive and transmit data. Similarly, the remaining DSP subsystems 12-2 and 12-3 may operate in either the ISDN mode or in the ATM mode. Preferably, a choice is made between these modes by programming at the configuration of the communications adapter card 10. For example, a configuration menu may be presented on the display screen (not shown) of the computing system 1 (shown in FIG. 1), asking for the selection of an ISDN or ATM mode for each attached transmission line 7, 7a.

With ATM data transmission and reception, the controller card processor 70 also performs various higher level protocol functions, such as handling virtual paths and circuits and cell routing.

The PCI-PCI bridge circuit 67 electrically isolates the PCI bus 66 from the PCI bus 68 and provides arbitration for the eight DSP subsystems 12 as they request busmaster service. This bridge circuit 67, may each be, for example, a DEC 21150 PCI-PCI Bridge chip, which can handle up to nine devices. The bridge circuit 67 includes a memory space which is divided into standard bridge configuration registers and device-specific configuration registers. The device-specific registers, which are not needed for standard implementations between PCI busses, are not programmed for this application. The standard configuration registers are controlled by the kernel of the controller card processor 70.

Figure 3A:
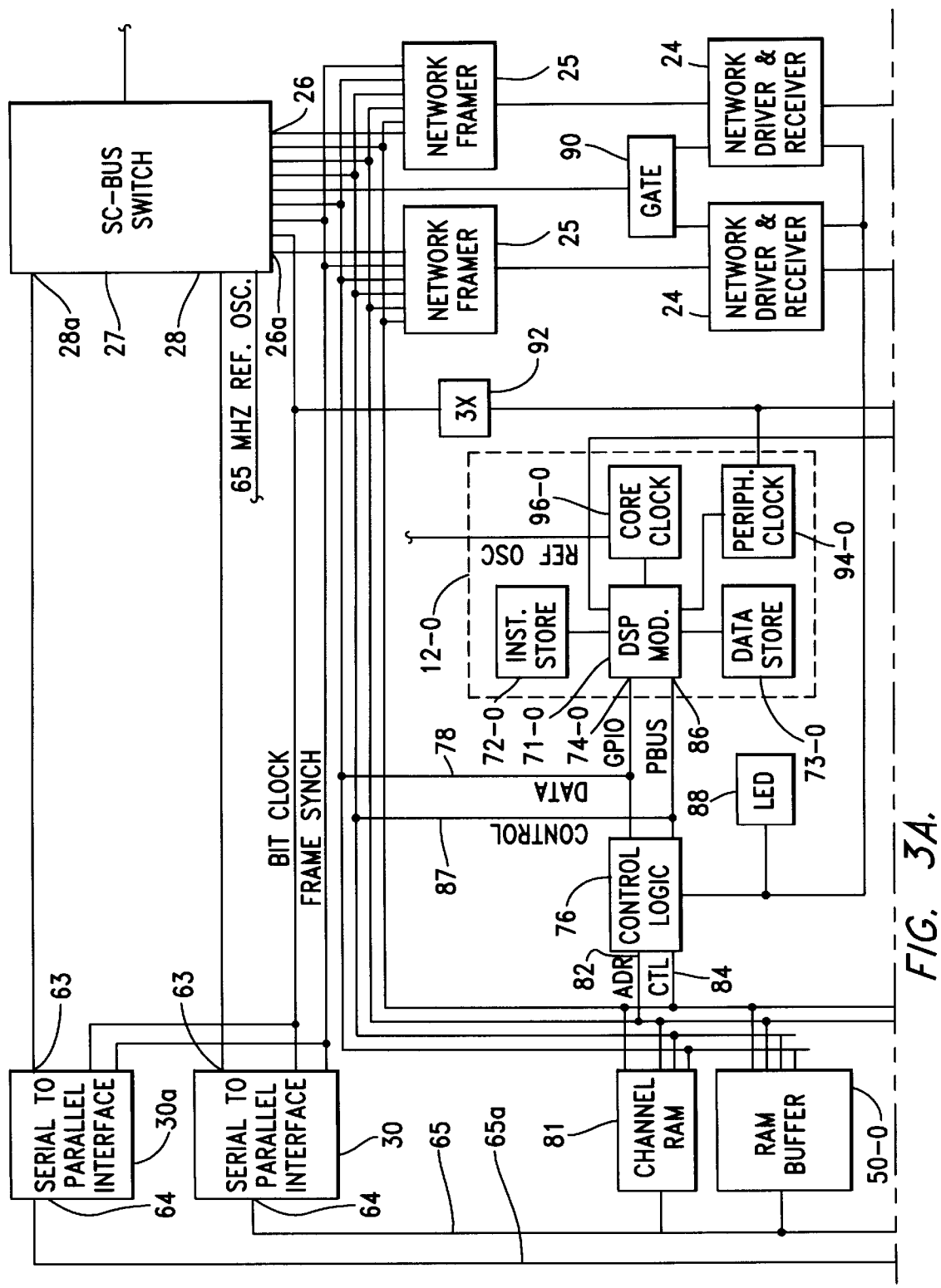
Figure 3B:
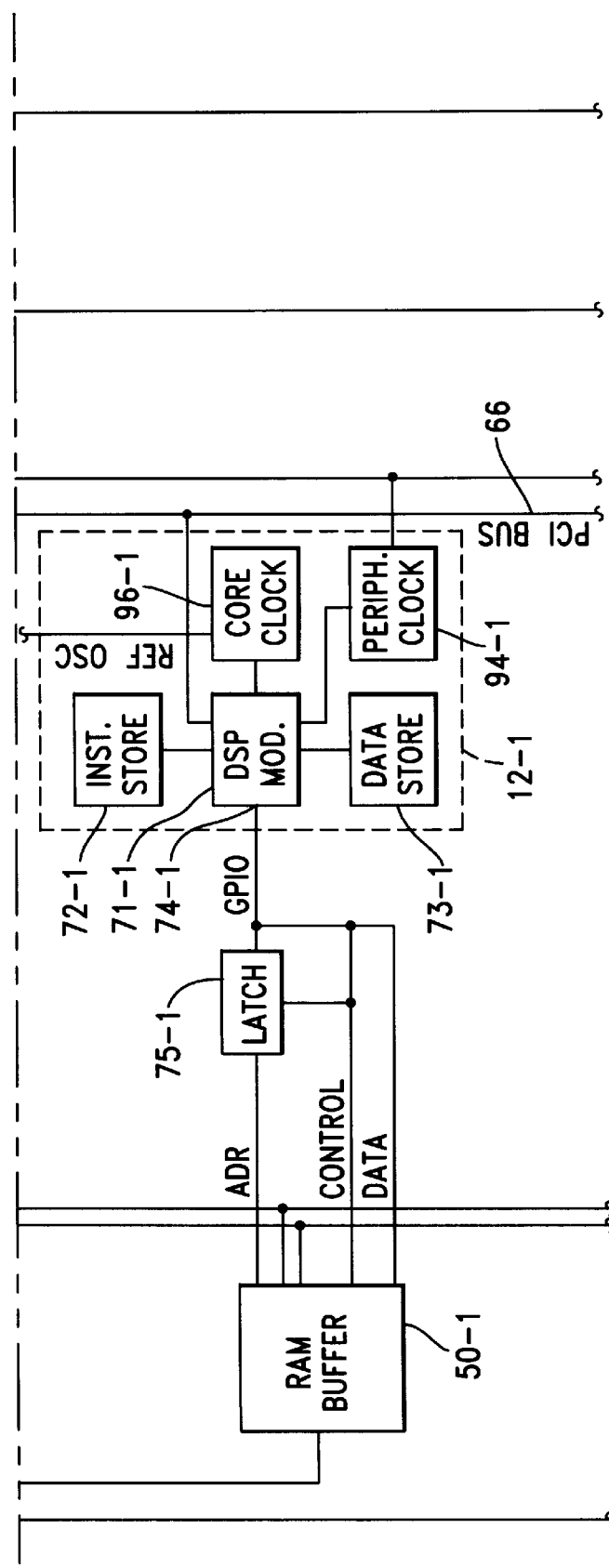

FIG. 3 is a block diagram of DSP subsystems 12-0, 12-1 and associated circuits, with an upper portion, FIG. 3A, showing the DSP subsystem 12-0 and associated circuits, while a lower portion, FIG. 3B, shows the DSP subsystem 12-1. FIG. 3B also applies to DSP subsystems 12-2 and 12-3, which are similar to DSP subsystem 12-1 except for their connection to parallel bus 65a instead of to parallel bus 65. The DSP subsystem 12-1 includes a DSP module 71-1, which is, for example, an MWAVE 3780P module, 128K×24 instruction storage 72-1, and 128K×16 data storage 73-1. The DSP module 71-1 drives the static RAM buffer 50-1 with its 16-bit GPIO port 74-1 and with an external 8-bit address latch module 75-1. The control code executing in DSP module 71-1 can only write to the transmit buffer area in RAM buffer 50-1, and can only read from the receive buffer area in this buffer 50-1.

The sixteen bits of the GPIO port 74 of each DSP module 71 can be programmed to be input only, output only, or bi-directional. A single DSP instruction can change the polarity of output bits, read the current state of the 16 bits, or tri-state a set of bits. Since only a single function can be performed with each DSP instruction, it requires a series of instructions to perform a timed sequence controlling an external device. In the communications adapter card 10 (shown in FIG. 4) nine DSP instructions are required to read and write a single address in the two-port RAM buffer. Each DSP subsystem 12-1 through 12-3 only controls two devices, the associated RAM buffer 50 and a frame counter (not shown). Thus, hardware for only these two devices is implemented in connection with these subsystems 12-1 through 12-3. However, the DSP code executed within these subsystems is identical to that of the DSP subsystem 12-0, which controls several additional devices. Each DSP subsystem 12 determines which devices to control by reading a subsystem ID value from its DSTORE memory space.

Again, the DSP subsystem 12-0 includes a DSP module 71-0, 128K×24 instruction storage 72-0, and 128K×16 data storage 73-0. The DSP subsystem 12-0 also has an associated static RAM buffer 50-0, but its control is handled through an external control logic module 76, which may be implemented, for example, using a PAL (Programmable Array Logic) chip from Advanced Micro Devices. The control logic module 76 also provides ADDRESS and CONTROL outputs through which the DSP subsystem 12-0 establishes read/write control of the SC-bus switch 27, and the network interface framer 25. The DSP module 71-0 uses its parallel, bidirectional GPIO port 74-0 as a data bus 78 to read and write to registers in the network framer 25, in the SC-bus switch 27, in a two-port channel RAM circuit 81, and in the two-port data RAM buffer 50-0. Control functions are developed from the PBUS port 86, being driven along control lines 87. A read or write to a register within the network framer 25 requires a sequence of DSP instructions which manipulate the GPIO port 74-0 to match the required timings for an I/O cycle of the network framer 25. The GPIO port 74-0 also supports an interrupt function to monitor signalling and error status from the network framer 25. Address lines 82 and additional control lines 84 also extend to these circuits 27, 25, 81, and 50-0 from control logic module 76. The address lines 82 and control lines 84 are also extended to two-port data RAM buffers 50-3 (shown in FIG. 2) through 50-7, so that the DSP subsystem can control operation of these devices. To prevent read/write access conflicts, each DSP subsystem 12-0 through 12-3 (shown in FIG. 2) can monitor the value of a common frame counter within control logic 76. Each DSP subsystem 12 uses this information to avoid writing in locations in both the transmit and receive buffers of its associated RAM buffer 50, when these buffers are being used by the serial to parallel interface circuits 30, 30*a*.

Control of the network interface driver and receiver 24 is established through the PBUS port 86 of the DSP module 71-0. This port 86 acts as an 8-bit slave ISA interface, with only write commands being needed to set latches in the control logic 76. The PBUS port 86 is self-clocking, requiring only one DSP instruction to issue a write command to the driver and receiver module 24, which only accepts write command from the PBUS port 86. A yellow/green LED 88 is also controlled in this way, providing a viable indication of the use of the communications adapter card 10, at its end, which can be seen at the rear of the computer 1 (shown in FIG. 1).

The two-port channel RAM module 81 is a single 1K×8 device controlled only by DSP subsystem 12-0. Only 64 locations are used within this RAM module 88, forming a first 32-location buffer used by the serial to parallel interface circuits 30, 30*a* (shown in FIG. 3A) and a second 32-location buffer used by the DSP subsystem 12-0. These two buffers are separated by an address bit controlled by a ping pong latch. Since the polarities of the two outputs of the ping pong latch are always opposite one another, both port addresses never simultaneously include the same value, preventing read/write conflicts from both ports to a common internal array. The DSP subsystem 12-0 controls the state of the ping pong latch. When the DSP subsystem 12-0 is using one buffer, the serial to parallel interface 30 is using the other. When the state of the ping pong latch is flipped, the buffers are reversed. This operation allows the DSP subsystem 12-0 to pre-load or modify channel or subsystem site information before turning over this new or updated buffer information to the serial to parallel interfaces 30, 30*a*.

The MWAVE 3780P module contains a ISP-5.6 DSP core, operable at processing speeds up to 44 MIP, which can access 128K of 24-bit instructions and 128K of 16-bit data storage. This module is a multifunction device containing PCI functions for DSP, UART, MIDI, Soundblaster, Soundblaster DMA Controller, and three PBUS parallel devices. In the example of the present invention, only the DSP device is configured for the PCI interface. Only in the DSP module 74-0, the three PBUS devices are used by the DSP core, but not by the PCI interface. There are three additional serial I/O ports available from each MWAVE module, but they are left unconnected, as they are not used. All of these additional peripheral interfaces and unused device functions are disabled and powered down through peripheral control and power management registers to minimize power consumption and to avoid resource conflicts.

In a preferred embodiment of the communications adapter 10, clocking begins with a 16-Mhz clock generated within one of the network driver and receivers 24, extracted from the received network data stream. From each of these network drivers and receivers 24, a clock signal is sent through a gate 90 to the SC-bus switch 27. Even when a received network data stream is not present, the network driver and receiver 24 provides a free-running clock signal. However, the gate 90 functions to allow the clock being generated in response to an actual received network data stream to be sent to the SC-bus switch 27 in the event that either one of the two circuits 24 is receiving such a data stream. This gate 90 may also be used to give preference to a clock signal generated from an ISDN data stream over a clock signal generated using a ATM data stream. Next, the SC-bus switch 27 generates a 4.096-Mhz BIT CLOCK signal, and an 8-Khz FRAME SYNCH clock signal, both of which are used to drive the network framer 25, and the serial to parallel interfaces 30, 30*a* in synchronization with the data stream. In a frequency multiplier 92, the frequency of the BIT CLOCK signal is multiplied by three to obtain a 12.288-Mhz clock signal used to synchronize interrupts developed within each DSP subsystem 12 with the data stream.

Each DSP subsystem 12 includes a peripheral clock generator 94 and a core clock generator 96. Each of these clock generators 94, 96 includes a PLL (Phase Locked Loop). The peripheral clock generator 94 provides a clocking signal for peripheral functions, being used particularly in timing the transmission of interrupts from the DSP subsystem 12. In particular, the peripheral clock generator 94 generates a 9.60-Khz clock signal and an 8.00-Khz clock signal for interrupts. Each core clock generator 96 is driven by a signal from a single external 33.8688-Mhz oscillator. The phase PLL circuit within this clock generator 94 is programmable to provide different clock speeds in accordance with the values stored in several clock speed controlling registers within the DSP subsystem. The clock signal frequency of the peripheral clock generator 96 is not changed in accordance with the values stored in these clock speed controlling registers. Each DSP subsystem 12 can write data into its own clock speed controlling registers, or such data may be written over the PCI bus 66 by, for example, the controller card processor 70.

Each DSP module 71 uses an internal clock generator 96 driven by an external 33.8688 Mhz oscillator. This internal PLL (Phase-Locked Loop) clock generator is programmable, allowing instruction cycle rates from a minimum of 17 MIPs to a maximum of 44 MIPs. Alternately, each of the four DSP modules 71 may be operated at a processing speed determined in accordance with the measured capabilities of the DSP complex 12 and the functions required by the task currently being performed, as described in the co-pending application, docket number BC9-97-041, cross-referenced above and incorporated herein for reference. In the example of the present invention, all DSP modules 71-0 through 71-3 are set to run at 44 MIPs.

Referring again to FIG. 2, both the controller processor 70 and the DSP subsystems 12 are able to interrupt one another across the connected PCI busses 66, 68. A single-threaded interrupting protocol is used within the system to prevent overruns. Four interrupt signals are supported by lines within a PCI bus. The DSP subsystem 12-0 is connected to INTERRUPT A, and the DSP subsystems 12-1, 12-2. and 12-3 are connected to INTERRUPT B, C, and D, respectively. When a DSP subsystem 12 wishes to interrupt the controller processor 70, it writes to its own MSA address '8000 0060'h, the HBRIDGE interrupt register within the PCI-PCI bridge 67.

While the sixteen bits in the HBRIDGE interrupt register are conventionally used to represent up to sixteen different types of service, a DSP subsystem 12, operating in accordance with the present invention, sends a control block of data representing interrupt(s) to be requested into a predetermined area within the data memory 89 of the controller card 4 by means of a DMA (Direct Memory Access) process. Then, the DSP subsystem 12 sets any bit to send an interrupt through the PCI busses 66, 68. When the controller processor 70 receives this interrupt, it determines that DSP subsystem 12-0 has requested an interrupt if the interrupt is received on the INTERRUPT A line, or that one of the DSP subsystems 12-1 through 12-3 has requested an interrupt, if the interrupt is received on the INTERRUPT B through D line. Likewise, if the interrupt has been received on the INTERRUPT B through D line, the controller processor 70 reads the HBRIDGE interrupt register from the corresponding DSP subsystem 12-1 through 12-3, checking for '1'$b$ bits.

While multiple interrupt requests from DSP subsystems 12 may be present, the controller processor 70 keeps track of which interrupt is being processed. At the end of an interrupt routine, the controller processor 70 writes to the HBRIDGE register in the particular DSP subsystem 12 whose interrupt request is active, a MASK of '0000'h. This write command clears the interrupt request. Otherwise, the DSP subsystem 12 may clear its HBRIDGE register after receiving an acknowledgment. The controller processor 70 interrupts a particular DSP subsystem 12 by writing to an I/O decode address '8000 06A2'h, the Asynchronous Interrupt Register. This 16-bit register has two special bits, bits 4 and 5, which are assigned to work with the interrupt protocol of the communications adapter 10. Bit 4 is a COMMAND INFORMATION bit, which tells a DSP subsystem 12 that a particular type of control block has been assured by the controller processor 70. The DSP subsystem 12 uses this information to fetch the actual control block from the memory of the controller 4, and to determine how the data should be processed. Bit 5 is a handshake acknowledgement for interrupts from a DSP subsystem 12 to the controller processor 70, indicating that the controller processor 70 has completed servicing a current interrupt from a DSP subsystem 12. Overruns are prevented, since interrupts from the DSP subsystem 12 are serviced in a single-threaded manner. Bit 5 interrupts operate in a request-response mode, while Bit 4 interrupts operate in a request-only mode. When the DSP subsystem 12 goes to the vector for either a Bit 4 or a Bit 5 interrupt, the bit turns off. The controller processor 70 does not poll this condition to arm the interrupt again; a standby area is checked to insure all current commands are cleared.

According to a preferred version of the present invention, a number of interrupts from each DSP subsystem 12 to the controller processor 70, in the form of interrupt blocks of data, are collected, or bundled, before they are sent to the controller processor 70, to further reduce the bandwidth required within this processor 70 for interrupt processing. A more detailed discussion of interrupt handling, which is herein incorporated for reference, is included in the co-pending application cross-referenced above, docket number BC9-97-047, filed Oct. 6, 1997, entitled "A DSP-Based, Multi-Bus, Multiplexing Communications Adapter."

With any of these versions, or combinations thereof, a power-on or other session beginning process may include the transmission of a single interrupt to get the process started. After one or more interrupt blocks are sent by DMA, an interrupt is sent along an interrupt line of the PCI busses 66, 68 (shown in FIG. 2), indicating that the processor 70 should check the appropriate locations with its data memory 89.

While particular advantage is gained through providing two network interfaces, allowing the simultaneous attachment of ATM and ISDN networks though a single communications adapter card, it is understood that an adapter built in accordance with the present invention may provide only one such interface, retaining an ability to be configured for attachment to either an ATM or ISDN network. Such a card would have advantages of not needing replacement in the event of changing needs and of allowing a smaller inventory of cards to be required.

While the invention has been described in its preferred form or embodiment with some degree of particularity, it is understood that this description has been given only by way of example and that numerous changes in the details of construction, fabrication and use, including the combination and arrangement of parts, may be made without departing from the spirit and scope of the invention.

What is claimed is:

1. A communications adapter, wherein said communications adapter comprises:

a first connector for electrically connecting a first transmission line;

a first network interface extending into said communications adapter from said first connector, a data bus and;

first signal processing means electrically connecting said data bus with said first network interface, said first signal processing means is operable in an ISDN mode, converting encoded data from said data bus for transmission in an ISDN format from said communications adapter through said first connector and converting data received by said communications adapter through said first connector in said ISDN format into an encoded format for transmission from said first signal processing means along said data bus, said first signal processing means is additionally operable in an ATM mode, converting encoded data from said data bus for transmission in an ATM format from said communications adapter through said first connector and converting data received by said communications adapter through said first connector in said ATM format into an encoded format for transmission from said first signal processing means along said data bus, said first signal processing means is programmably configurable for operation in said ISDN mode and in said ATM mode, said first signal processing means includes:
first and second digital signal processors;
a first parallel bus;
a first serial to parallel interface connecting said first parallel data bus with said first network interface, wherein said first serial to parallel interface converts parallel data from said first parallel data bus into serial data driving said first network interface, and wherein said first serial to parallel interface converts serial data from said first network interface into parallel data driving said first parallel bus;
a first buffer extending between said first digital signal processor and said first parallel data bus, wherein data is written to said first buffer and read therefrom by said first digital signal processor and by said first parallel bus; and
a second buffer extending between said second digital signal processor and said first parallel data bus, wherein data is written to said second buffer and read therefrom by said second digital signal processor and by said first data bus, said first and second digital signal processors are each executing a program controlling operation thereof in said ISDN mode, said first digital signal processor converts data moving along a first plurality of ISDN channels through said first connector, said second digital signal processor converts data moving along a second plurality of ISDN channels through said first connector, data received by said communications adapter through said first connector is simultaneously written to said first and second buffers by said first parallel bus, data to be transmitted from said communications adapter along said first plurality of ISDN channels is written to said first buffer by said first digital signal processor, and data to be transmitted from said communications adapter along said second plurality of ISDN channels is written to said second buffer by said second digital signal processor.

2. A communications adapter, wherein said communications adapter comprises:
a first connector for electrically connecting a first transmission line;
a first network interface extending into said communications adapter from said first connector,
a data bus;
first signal processing means electrically connecting said data bus with said first network interface;
an external bus interface; and
a switch connecting operating in a first mode connecting said first signal processing means with said first network interface, in a second mode connecting said first signal processing means with said external bus interface, and in a third mode connecting said first network interface with said external bus interface,
a second connector for electrically connecting a second transmission line;
a second network interface extending into said communications adapter from said second connector; and
second signal processing means electrically connecting said data bus with said second network interface,
said first signal processing means is operable in an ISDN mode, converting encoded data from said data bus for transmission in an ISDN format from said communications adapter through said first connector and converting data received by said communications adapter through said first connector in said ISDN format into an encoded format for transmission from said first signal processing means along said data bus,
said first signal processing means is additionally operable in an ATM mode, converting encoded data from said data bus for transmission in an ATM format from said communications adapter through said first connector and converting data received by said communications adapter through said first connector in said ATM format into an encoded format for transmission from said first signal processing means along said data bus,
said second signal processing means is operable in an ISDN mode, converting encoded data from said data bus for transmission in an ISDN format from said communications adapter through said second connector and converting data received by said communications adapter through said second connector in said ISDN format into an encoded format for transmission from said second signal processing means along said data bus, and wherein said second signal processing means is additionally operable in an ATM mode, converting encoded data from said data bus for transmission in an ATM format from said communications adapter through said second connector and converting data received by said communications adapter through said second connector in said ATM format into an encoded format for transmission from said second signal processing means along said data bus,
said first signal processing means includes first and second digital signal processors, a first parallel bus, a first serial to parallel interface connecting said first parallel data bus with said first network interface, with said first serial to parallel interface converting parallel data from said first parallel data bus into serial data driving said first network interface, and with said first serial to parallel interface converting serial data from said first network interface into parallel data driving said first parallel bus, a first buffer extending between said first digital signal processor and said first parallel data bus, wherein data is written to said first buffer and read therefrom by said first digital signal processor and by said first parallel bus, and a second buffer extending between said second digital signal processor and said first parallel data bus, wherein data is written to said second buffer and read therefrom by said second digital signal processor and by said first data bus, and
said second signal processing means includes third and fourth digital signal processors, a second parallel bus, a second serial to parallel interface connecting said second parallel data bus with said second network interface, with said first serial to parallel interface converting parallel data from said second parallel data bus into serial data driving said second network interface, and with said second serial to parallel interface converting serial data from said second network interface into parallel data driving said second parallel bus, a third buffer extending between said third digital signal processor and said second parallel data bus, wherein data is written to said third buffer and read therefrom by said third digital signal processor and by said second parallel bus, and a fourth buffer extending between said fourth digital signal processor and said second parallel data bus, wherein data is written to said fourth buffer and read therefrom by said fourth digital signal processor and by said second data bus.

3. The communications adapter of claim 2, additionally comprising:

an external bus interface; and a switch establishing a first path for data flow between said first signal processing means and said first network interface, a second path for data flow between said second signal processing means and said second network interface, a third data path for data flow between said first signal processing means and said external bus interface, a fourth data path for data flow between said second signal processing means and said external bus interface, a fifth data path for data flow between said first network interface and said external bus interface, and a sixth data path for data flow between said second network interface and said external bus interface.

4. The communications adapter of claim 2, wherein

ISDN data is transmitted and received through said first connector, and

ATM data is transmitted and received through said second connector.

5. The communications adapter of claim 2, wherein said first and second signal processing means are independently programmably configurable for operation in said ISDN mode and in said ATM mode.

6. A communications adapter, wherein said communications adapter comprises:

a first connector for electrically connecting a first transmission line;

a first network interface extending into said communications adapter from said first connector, a data bus;

first signal processing means electrically connecting said data bus with said first network interface;

an external bus interface; and a switch connecting operating in a first mode connecting said first signal processing means with said first network interface, in a second mode connecting said first signal processing means with said external bus interface, and in a third mode connecting said first network interface with said external bus interface, said first signal processing means is operable in an ISDN mode, converting encoded data from said data bus for transmission in an ISDN format from said communications adapter through said first connector and converting data received by said communications adapter through said first connector in said ISDN format into an encoded format for transmission from said first signal processing means along said data bus, said first signal processing means is additionally operable in an ATM mode, converting encoded data from said data bus for transmission in an ATM format from said communications adapter through said first connector and converting data received by said communications adapter through said first connector in said ATM format into an encoded format for transmission from said first signal processing means along said data bus, said first signal processing means includes first and second digital signal processors, a first parallel bus, a first serial to parallel interface connecting said first parallel data bus with said first network interface, with said first serial to parallel interface converting parallel data from said first parallel data bus into serial data driving said first network interface, and with said first serial to parallel interface converting serial data from said first network interface into parallel data driving said first parallel bus, a first buffer extending between said first digital signal processor and said first parallel data bus, wherein data is written to said first buffer and read therefrom by said first digital signal processor and by said first parallel bus, and a second buffer extending between said second digital signal processor and said first parallel data bus, wherein data is written to said second buffer and read therefrom by said second digital signal processor and by said first data bus.

* * * * *